(12) United States Patent
Paramo

(10) Patent No.: US 8,720,699 B2
(45) Date of Patent: May 13, 2014

(54) HOIST SYSTEM FOR A BICYCLE, INCLUDING REMOVABLE HOIST ATTACHMENT

(76) Inventor: Peter Paramo, Los Angeles, CA (US)

(*) Notice: Subject to any disclaimer, the term of this patent is extended or adjusted under 35 U.S.C. 154(b) by 65 days.

(21) Appl. No.: 13/525,289

(22) Filed: Jun. 16, 2012

(65) Prior Publication Data

US 2013/0334384 A1    Dec. 19, 2013

(51) Int. Cl.
  *B25H 1/00* (2006.01)
(52) U.S. Cl.
  CPC .................................. *B25H 1/0014* (2013.01)
  USPC .............................................. 211/22; 269/71
(58) Field of Classification Search
  CPC ...... B25H 1/0007; B25H 1/0014; B62H 3/00; B62H 3/02; B25B 5/147
  USPC ................. 248/226.11, 342, 544, 689, 316.8, 248/230.1, 317, 322, 121, 176.1; 403/67, 403/70, 169–178, 292; 297/463.1; 269/3, 6, 269/71, 75; 211/17, 22
  See application file for complete search history.

(56) References Cited

U.S. PATENT DOCUMENTS

| 594,627 | A | * | 11/1897 | Hewlett | 211/22 |
| 2,803,349 | A | * | 8/1957 | Talbot | 211/22 |
| 3,514,091 | A | * | 5/1970 | Engstrom et al. | 269/68 |
| 3,879,027 | A | * | 4/1975 | Thurmond, Jr. | 269/157 |
| 3,947,010 | A | * | 3/1976 | Zeller | 269/100 |
| 3,981,491 | A | * | 9/1976 | Snyder | 269/64 |
| 5,765,821 | A | * | 6/1998 | Janisse et al. | 269/16 |
| 7,712,614 | B2 | * | 5/2010 | Carlson et al. | 211/22 |
| 2008/0272264 | A1 | * | 11/2008 | Carlson et al. | 248/354.4 |

* cited by examiner

*Primary Examiner* — Terrell McKinnon
*Assistant Examiner* — Ingrid M Weinhold
(74) *Attorney, Agent, or Firm* — James A. Italia; Italia IP

(57) ABSTRACT

A hoist system for securing a bicycle in an elevated or stationary position includes a hoist attachment and a clamp. The hoist attachment, which connects to a seat post of the bicycle, includes a T-shaped joint, a pair of tube members, a T-shaped tube, and a pair of attachment brackets. The T-shaped joint has receptacles for receiving the pair of tube members and the T-shaped tube. The first tube member attaches to the T-shaped joint via a first receptacle, and the second tube member attaches to the T-shaped joint via a second receptacle. The T-shaped tube includes a stem and a cross-piece, the stem attaching to the T-shaped joint via a third receptacle. The pair of attachment brackets, which are configured to engage the seat post of the bicycle, extends beneath the T-shaped joint from the T-shaped tube to the first tube member.

17 Claims, 6 Drawing Sheets

… ….

HOIST SYSTEM FOR A BICYCLE, INCLUDING REMOVABLE HOIST ATTACHMENT

TECHNICAL FIELD

The present disclosure is directed to the field of bicycles and, more specifically, a hoist system for lifting bicycles or bicycle frames, in which the hoist system includes a removable hoist attachment for the bicycle.

BACKGROUND

Bicycles have long been used for transport, recreation, and sport. Originally introduced in the 1800's, bicycles now number more than 1 billion worldwide. New bicycles can range in price from about $50 (US) to more than $20,000 (US), depending on the quality, type, and weight. For avid cyclists, a bicycle may be viewed as an investment, and biking may be seen as a lifestyle rather than a hobby.

From time to time, it may become necessary for a cyclist to work on or to repair his bicycle. In many instances, lifting the bicycle off the ground or floor improves the cyclist's ability to access the bicycle without undue bending and strain. Heretofore, methods of hoisting bicycles have involved attaching a clamp to the seat post (that is, the generally vertical post 102 that supports a seat 106, as shown in FIG. 1) and/or the top tube (that is, the generally horizontal member 104 of the frame located between the seat post and the head tube) and then attaching the clamp to a vertical pole at a desired height. It has been found that clamps affixed in these locations, while functional, tend to scratch the bicycle and damage its finish.

Accordingly, it would be desirable to have a device for lifting a bicycle without damaging the bicycle.

Further, it would be desirable to have a device for lifting a bicycle that easily attaches to the bicycle itself and that securely holds the bicycle while hoisted.

The present invention addresses these needs.

SUMMARY

A hoist system for securing a bicycle in an elevated or stationary position includes a hoist attachment and a clamp. The hoist attachment connects to a seat post of the bicycle. The hoist attachment includes a T-shaped joint, a first tube member, a second tube member, a T-shaped tube, and a pair of attachment brackets. The T-shaped joint has a first receptacle, a second receptacle perpendicular to the first receptacle, and a third receptacle opposite the first receptacle and perpendicular to the second receptacle. The first tube member attaches to the T-shaped joint via the first receptacle, and the second tube member attaches to the T-shaped joint via the second receptacle. The T-shaped tube includes a stem and a cross-piece, the stem attaching to the T-shaped joint via the third receptacle and the cross-piece defining a first end portion and a second end portion. The pair of attachment brackets, which are configured to engage the seat post of the bicycle, extends beneath the T-shaped joint from the T-shaped tube to the first tube member.

An alternate hoist attachment for a bicycle is also contemplated herein. The hoist attachment includes a T-shaped joint, an intermediate tube member, a first T-shaped tube, a first tube member, a second tube member, a second T-shaped tube, and a pair of attachment brackets. The T-shaped joint has a first receptacle, a second receptacle perpendicular to the first receptacle, and a third receptacle opposite the first receptacle and perpendicular to the second receptacle. The intermediate tube is attached to the T-shaped joint via the first receptacle. The first T-shaped tube includes a stem and a cross-piece, one end portion of the cross-piece defining a receptacle into which the intermediate tube is attached and an opposite end portion defining a receptacle for receipt of a first tube member, and the stem defining a pair of apertures therethrough. The first tube member is attached to the cross-piece of the T-shaped tube opposite the intermediate tube, while the second tube member is attached to the T-shaped joint via the second receptacle. The second T-shaped tube also includes a stem and a cross-piece, the stem being attached to the T-shaped joint via the third receptacle and the cross-piece defining a first end portion and a second end portion. The pair of attachment brackets extends beneath the T-shaped joint from the second T-shaped tube to the first T-shaped tube, where the attachment brackets are secured within respective apertures in each of the T-shaped tubes, and wherein the attachment brackets are configured to engage the seat post of the bicycle.

BRIEF DESCRIPTION OF THE DRAWINGS

A full and complete description of the present storage system is provided herein with reference to the appended figures, in which.

DETAILED DESCRIPTION

Reference is now made to the drawings for illustrations of various embodiments of the present hoist system and hoist attachment device.

Figure 1:
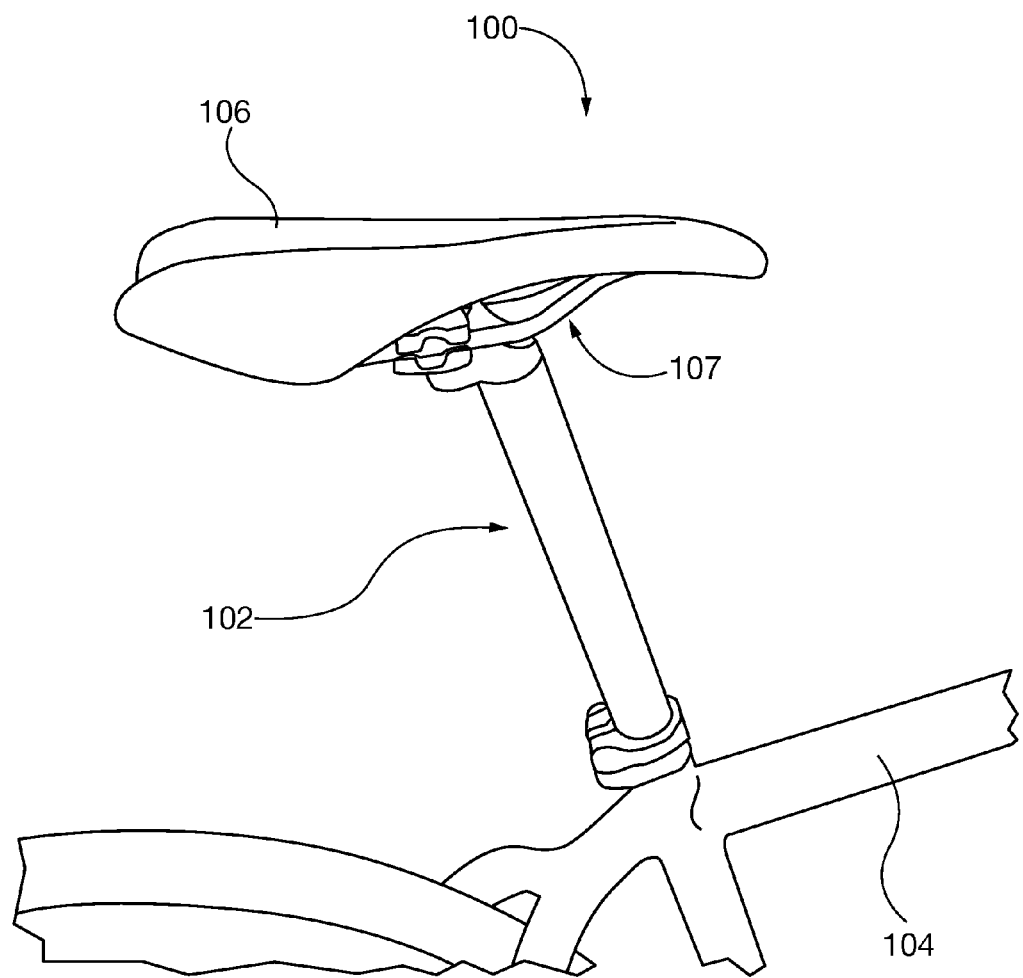
FIG. 1 is a perspective view of a conventional bicycle seat assembly upon which the present invention may be applied.

FIG. 1 illustrates a conventional bicycle 100 having a seat, or saddle, 106, which is supported by a seat post 102. The seat post 102 includes a pair of notches 103 for receiving brackets 107 attached to the bottom of the seat 106. The brackets 107 are secured within the notches 103 to hold the seat 106 in position. The frame of the bicycle 100 also has a standard top tube 104 that extends, in a generally horizontal direction, between the seat post 102 and the head post (not shown).

Conventionally, when bicycles (such as bicycle 100) are serviced, a clamp is attached directly to the seat post 102, in an area between the seat 106 and the joint with the top tube 104. The clamp is then attached to an adjacent support, such as a garage post or free-standing pole, for setting the height of the bicycle 100 and/or for securing the bicycle 100 in an upright position. Clamping the seat post 102, as described, may result in the bicycle 100 being scratched or damaged, perhaps even having the seat post 102 become bent from excessive clamping pressure. Over time, and with repeated servicing, the seat post 102 may accumulate damage to the extent that the bicycle 100 requires repainting or more serious repair.

Alternately, some cyclists who are concerned about cosmetic damage to their bicycles use other methods to hoist their bicycles. For example, they may use ropes or elastic cables (not shown), which are attached to the seat post 102 or the top post 104, to hold their bicycles. However, these alternate methods result in the bicycle 100 being less secure and more prone to damage due to falling should the ropes or cables break or become loosened.

Figure 2:
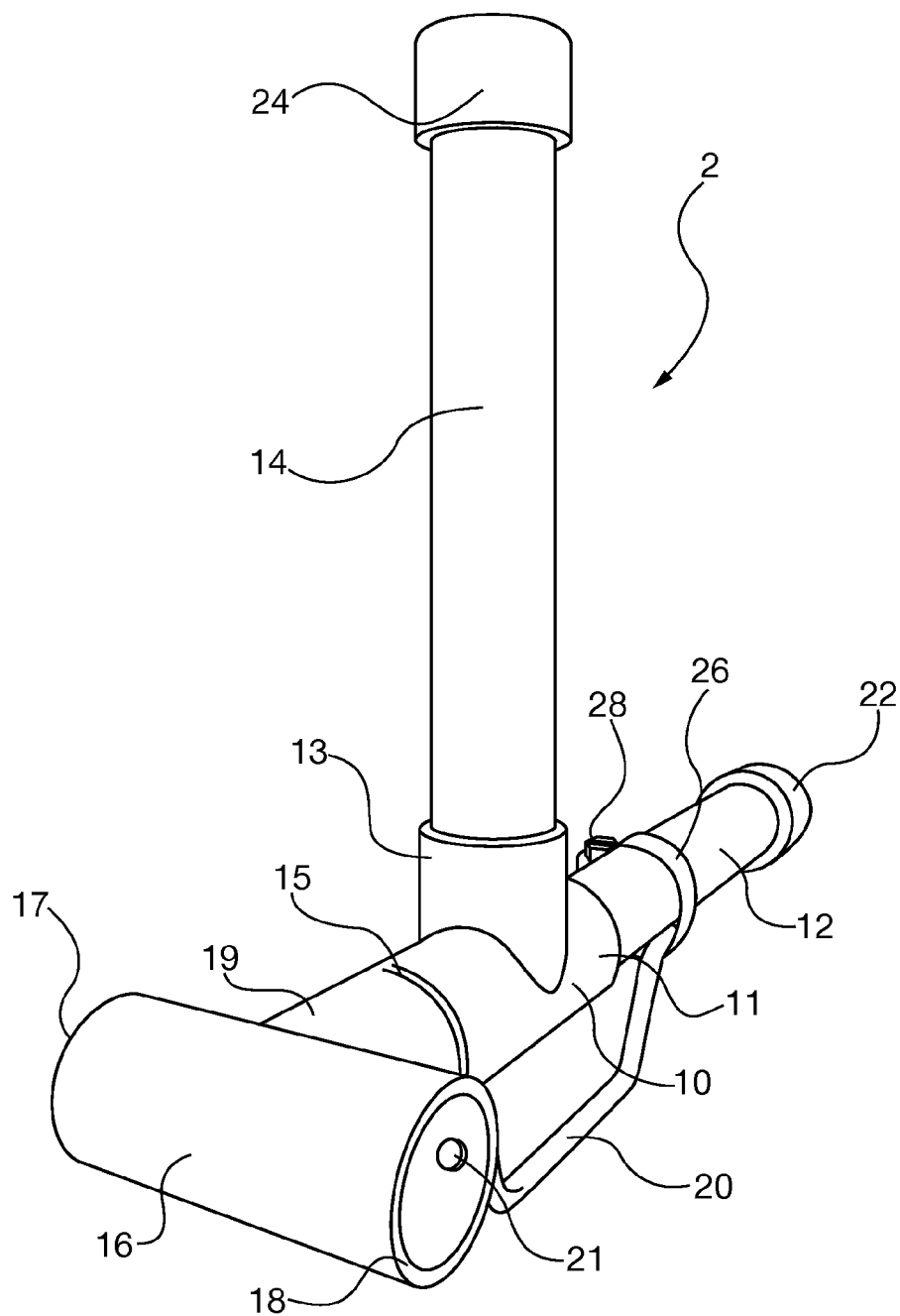
FIG. 2 is an isometric side view of a hoist attachment, according to a first aspect provided herein.
Figure 3:
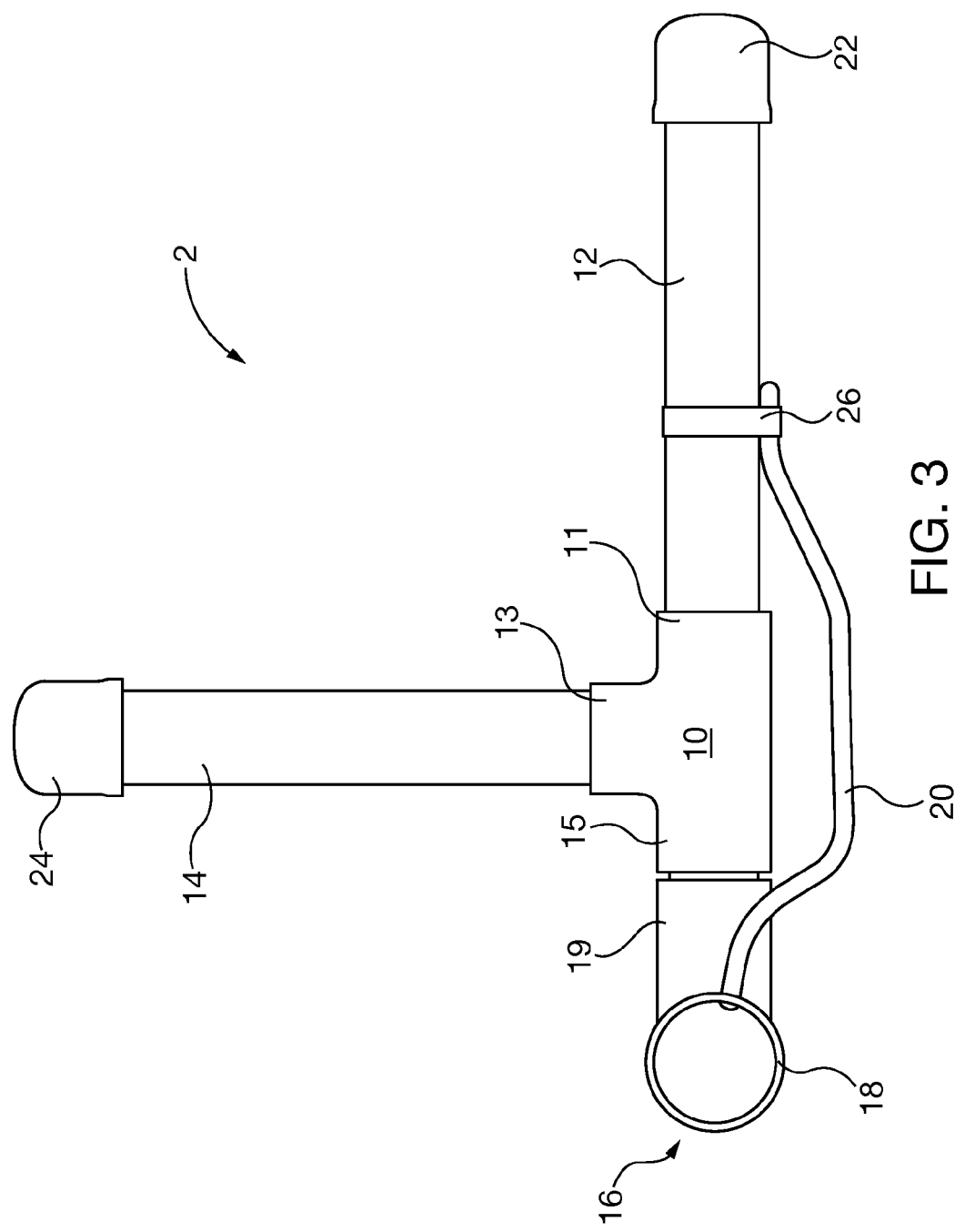
FIG. 3 is a side plan view of the hoist attachment of FIG. 2.
Figure 4:
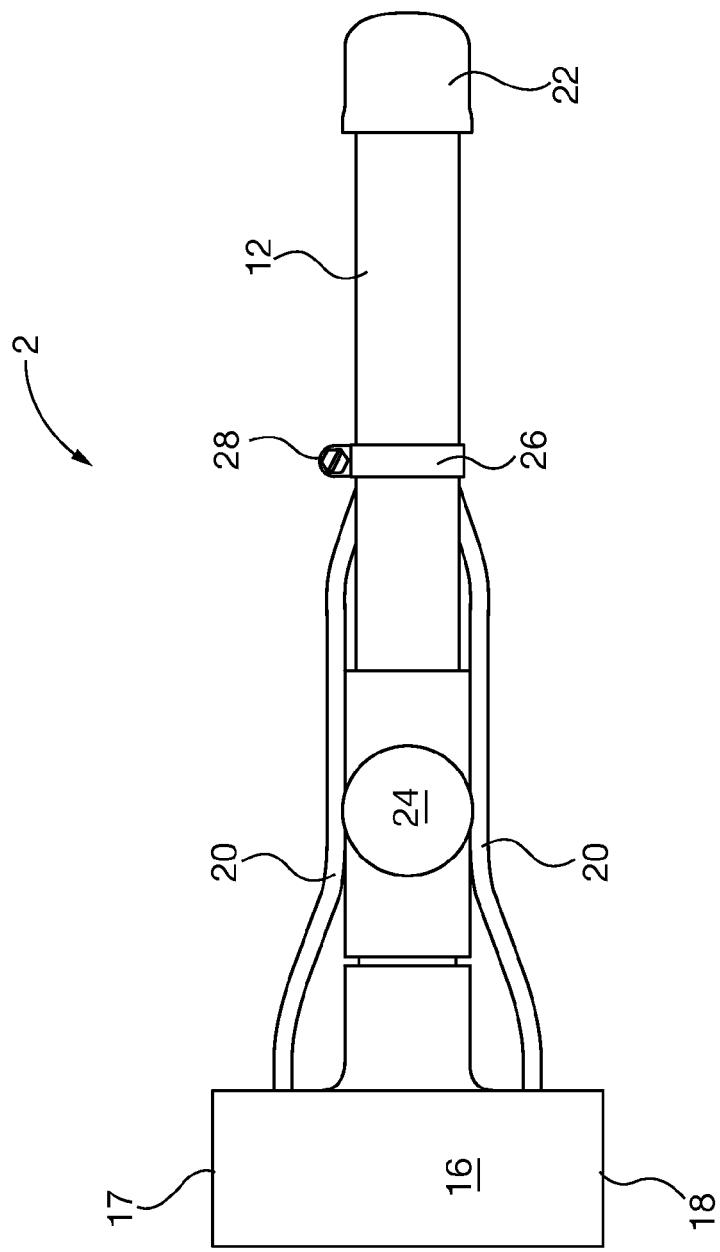
FIG. 4 is an overhead plan view of the hoist attachment of FIG. 2.

According to a first aspect herein, FIGS. 2 through 4 illustrate a hoist attachment 2 (or "hoist attachment device") for attachment to a bicycle 100, using the existing notches 103 at the distal end of the seat post 102. The hoist attachment 2 provides a surrogate attachment surface (that is, vertically oriented tube member 14) to which a clamp may be attached (the clamp being shown in FIG. 6).

The hoist attachment 2 includes a centrally located T-shaped joint 10 having a first receptacle 11, a second receptacle 13 perpendicular to the first receptacle 11, and a third receptacle 15 opposite the first receptacle and perpendicular to the second receptacle 13. A first tube member 12 extends in a generally horizontal direction and is attached to the T-shaped joint 10 via the first receptacle 11. A second tube member 14 extends in a generally vertical direction and is attached to the T-shaped joint 10 via the second receptacle 13.

A T-shaped tube 16 has a stem 19 that is attached to the T-shaped joint 10 via the third receptacle 15. The T-shaped tube 16 is integral with a cross-piece having a first end 17 and a second end 18, the first and second ends 17, 18 defining an axis transverse and perpendicular to a longitudinal axis drawn through the first tube member 12. Each end 17, 18 of the T-shaped tube 16 defines an aperture 21 therethrough, the apertures 21 being used for securing a pair of attachment brackets 20 (both of which are visible in the overhead view of FIG. 4).

The attachment brackets 20 are curvilinear pieces of metal that extend beneath the T-shaped joint 10 from the T-shaped tube 16 to the first tube member 12. The attachment brackets 20 are configured to engage the pre-existing notches 103 on the seat post 102 of a bicycle 100. The attachment brackets 20 have a profile that curves inwardly and downwardly from the ends 17, 18 of the T-shaped tube 16, extends in a generally horizontal direction beneath the T-shaped joint 10, and slopes upwardly to the first tube member 12, the terminal ends of the brackets 20 being attached to the T-shaped tube 16 and the first tube member 12, as described below.

Figure 5:
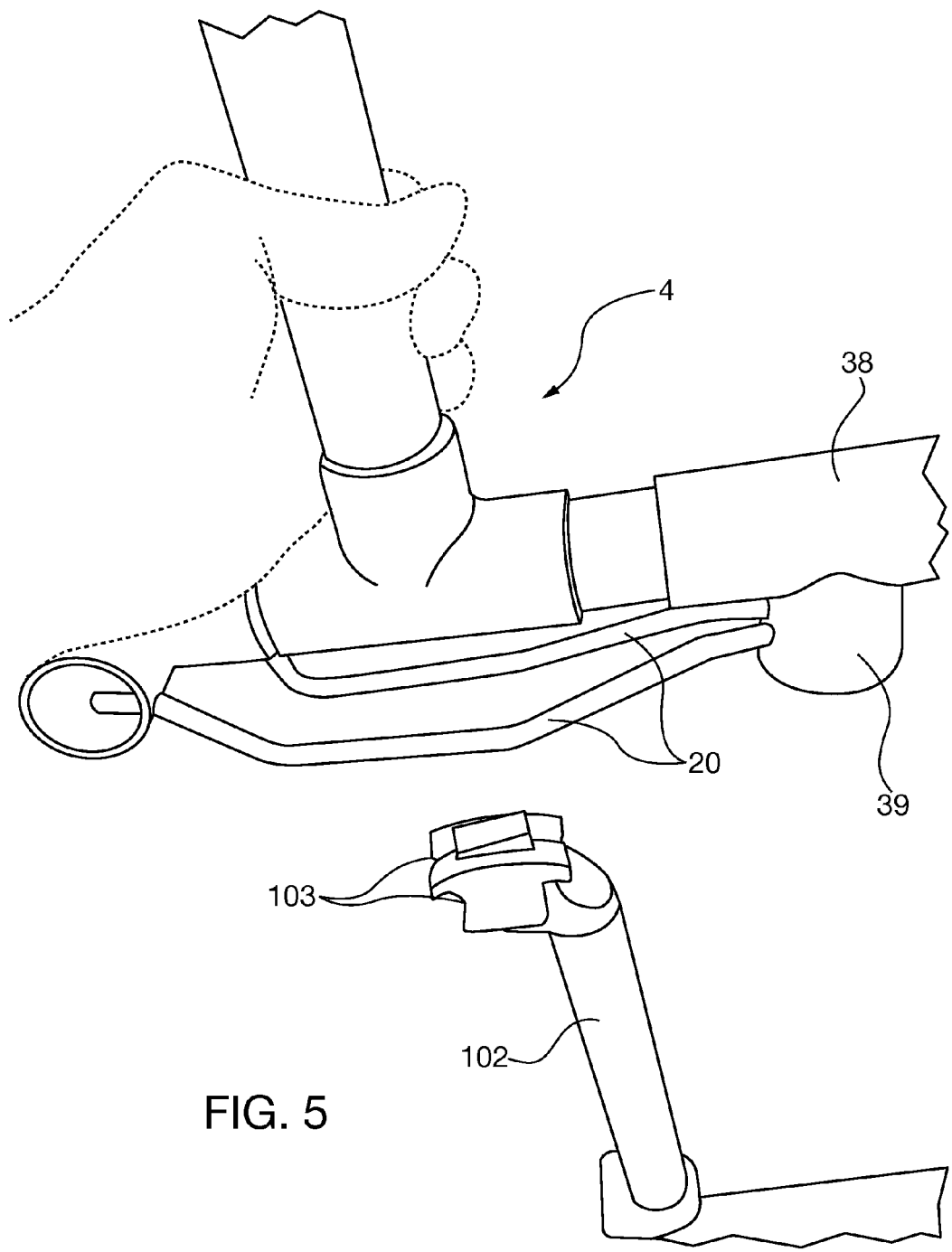
FIG. 5 is a side plan view of an alternate version of the hoist attachment of FIG. 1, according to another aspect provided herein.
Figure 6:
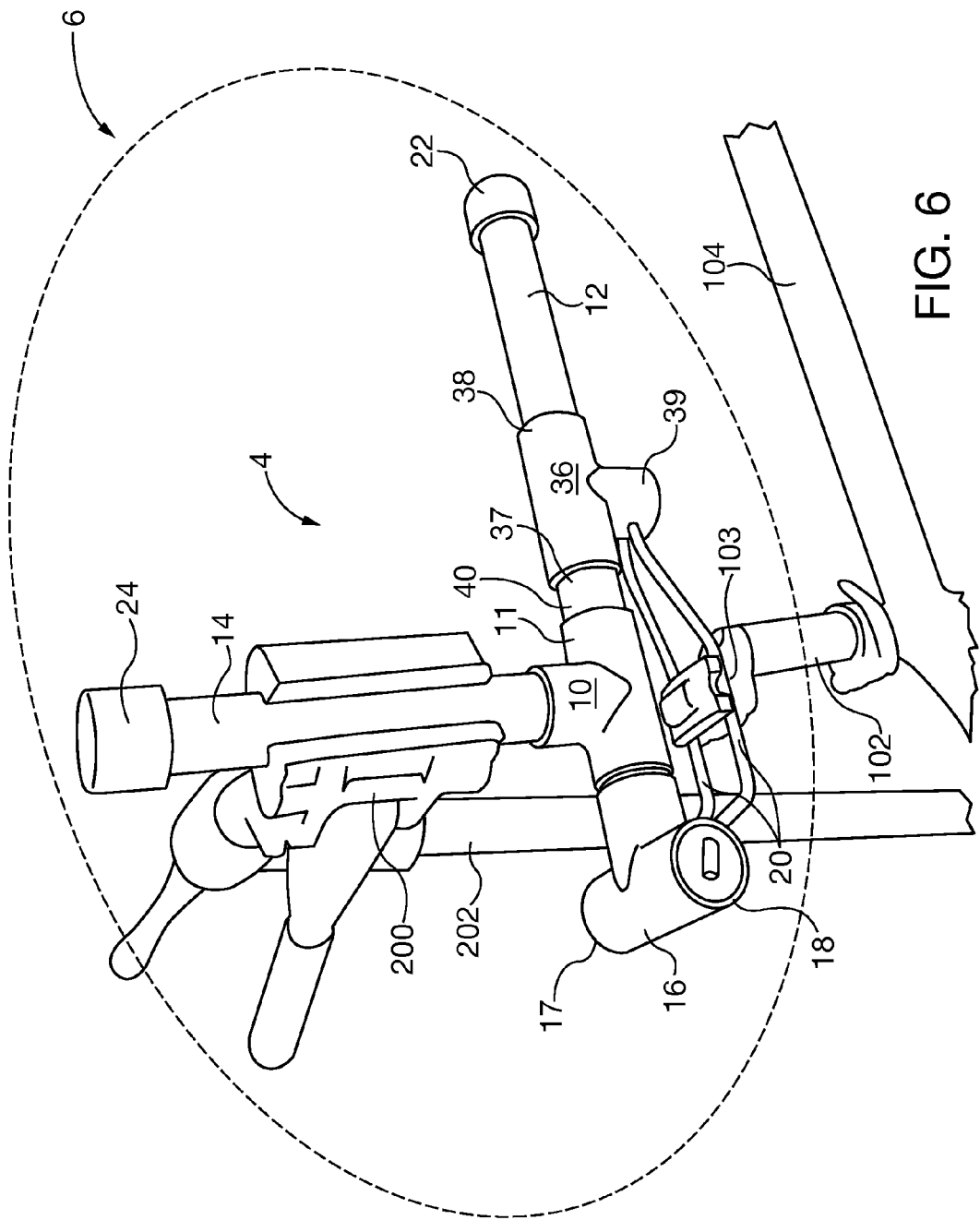
FIG. 6 is a side plan view of a bicycle to which a hoist system is secured, the hoist system including the hoist attachment of FIG. 5 and a clamp.

A first end of each attachment bracket 20 is held within a respective aperture 21 in an end (e.g., 17) of the T-shaped tube 16. The distal ends of each attachment bracket 20 are secured, as shown in FIGS. 2-4, by a stainless steel hose clamp 26, which is adjustable by a screw 28, or a similar joining mechanism. An alternate means for securing the brackets 20 is illustrated in FIGS. 5 and 6 and will be discussed below with reference to those Figures.

The T-shaped joint 10, the first tube member 12, the second tube member 14, and the T-shaped tube 16 may be joined together by any means known in the art, including adhesives. Alternately, the components may be welded or bolted together. Although the components may be made from the same material (such as PVC pipes and joints), it is contemplated that the components instead may be made of different materials.

The distal ends of the first tube member 12 and the second tube member 14 may be provided with safety caps 22, 24, respectively, to facilitate handling and use of the hoist attachment 2.

FIG. 3 shows the hoist attachment 2 from a side perspective, while FIG. 4 illustrates the hoist attachment 2 from an overhead perspective. Like numbers are used in these drawings to indicate like elements, and, as such, these drawings need not be separately described.

An alternate version of a hoist attachment is illustrated in FIGS. 5 and 6 as hoist attachment 4. The hoist attachment 4 includes many of the same components used in the hoist attachment 2 shown in FIGS. 2 through 4. According to this aspect, however, an intermediate tube member 40 is connected to the first receptacle 11 of the T-shaped joint 10. The intermediate tube member 40 connects to a T-shaped tube 36, which in turns connects to the first tube member 12. The T-shaped tube 36 includes a cross-piece having a first end 37 to which the intermediate tube member 40 is connected and a second end 39 to which the first tube member 12 is connected, the tube members 12, 40 extending in opposite directions. The T-shape tube 38 further includes a stem 39 projecting downwardly from the cross-piece. In this aspect, the terminal ends of the attachment brackets 20 connect to the stem 39, rather than to the first tube member 12.

FIG. 5 further shows the hoist attachment 4 in a position ready for engaging the notches 103 on the seat post 102 of a bicycle (not shown). The attachment brackets 20 are spaced to accommodate the spacing of the notches 103 for easy attachment and detachment of the hoist attachment device 4 (or 2).

Once the hoist attachment device 4 is connected to the notches 103, a clamp 200 may be secured to the second tube member 14, as shown in FIG. 6. The clamp 200 is further joined to a vertical post 202, such as a free-standing post, a garage post, or some other adjacent structural support. The hoist attachment 4 and the clamp 200 together form a hoist system 6 for lifting and/or securing a bicycle in an elevated and/or upright position, without inflicting damage to the bicycle itself.

The preceding discussion merely illustrates the principles of the present hoist system and hoist attachment device for bicycles. It will thus be appreciated that those skilled in the art may be able to devise various arrangements, which, although not explicitly described or shown herein, embody the principles of the inventions and are included within their spirit and scope. Furthermore, all examples and conditional language recited herein are principally and expressly intended to be for educational purposes and to aid the reader in understanding the principles of the inventions and the concepts contributed by the inventor to furthering the art and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. Terms such as "first", "second", "horizontal", and "vertical" are intended only to aid in the reader's understanding of the drawings and are not to be construed as limiting the invention being described to any particular orientation or configuration.

This description of the exemplary embodiments is intended to be read in connection with the figures of the accompanying drawings, which are to be considered part of the entire description of the invention. The foregoing description provides a teaching of the subject matter of the appended claims, including the best mode known at the time of filing, but is in no way intended to preclude foreseeable variations contemplated by those of skill in the art.

What is claimed is:

1. A hoist attachment for a bicycle, the bicycle having a seat post, the hoist attachment comprising:
   a T-shaped joint having a first receptacle, a second receptacle perpendicular to the first receptacle, and a third receptacle opposite the first receptacle and perpendicular to the second receptacle;
   a first tube member attached to the T-shaped joint via the first receptacle;
   a second tube member attached to the T-shaped joint via the second receptacle;
   a T-shaped tube having a stem and a cross-piece, the stem being attached to the T-shaped joint via the third receptacle and the cross-piece defining a first end portion and a second end portion; and
   a pair of attachment brackets extending beneath the T-shaped joint from the T-shaped tube to the first tube member, wherein the pair of attachment brackets are configured to engage the seat post of the bicycle.

2. The hoist attachment of claim 1, wherein, when the hoist attachment is installed on the bicycle, the first tube member extends in a substantially horizontal direction, and the second tube member extends in a substantially vertical direction.

3. The hoist attachment of claim 1, further comprising a pair of safety caps, such safety caps being installed at distal ends of the first tube member and the second tube member.

4. The hoist attachment of claim 1, wherein the first tube member, the second tube member, and the T-shaped tube are secured to the T-shaped joint by an adhesive.

5. The hoist attachment of claim 1, wherein the first and second end portions of the T-shaped tube each define an aperture therethrough for receipt of an end of one of the respective attachment brackets.

6. The hoist attachment of claim 1, further comprising a hose clamp with a screw, the hose clamp securing the attachment brackets to the first tube member, the attachment brackets being secured at the respective ends thereof.

7. A hoist system for a bicycle, the bicycle having a seat post, the hoist system comprising:
   a hoist attachment comprising a T-shaped joint having a first receptacle, a second receptacle perpendicular to the first receptacle, and a third receptacle opposite the first receptacle and perpendicular to the second receptacle; a first tube member attached to the T-shaped joint via the first receptacle; a second tube member attached to the T-shaped joint via the second receptacle; and a T-shaped tube attached to the T-shaped joint via the third receptacle; and a pair of attachment brackets extending beneath the T-shaped joint from the T-shaped tube to the first tube member, wherein the pair of attachment brackets are configured to engaged the seat post of a bicycle; and
   a clamp configured for simultaneous attachment to the first tube member and to an adjacent structure, wherein, when the clamp is attached to the first tube member and to the adjacent structure, the bicycle is secured in an elevated position.

8. The hoist system of claim 7, wherein, when the hoist attachment is installed on the bicycle, the first tube member extends in a substantially horizontal direction, and the second tube member extends in a substantially vertical direction.

9. The hoist system of claim 7, further comprising a pair of safety caps, such safety caps being installed at distal ends of the first tube member and the second tube member.

10. The hoist system of claim 7, wherein the first tube member, the second tube member, and the T-shaped tube are secured to the T-shaped joint by an adhesive.

11. The hoist system of claim 7, wherein the first and second end portions of the T-shaped tube each define an aperture therethrough for receipt of an end of one of the respective attachment brackets.

12. The hoist system of claim 7, further comprising a hose clamp with a screw, the hose clamp securing the attachment brackets to the first tube member, the attachment brackets being secured at the respective ends thereof.

13. A hoist attachment for a bicycle, the bicycle having a seat post, the hoist attachment comprising:
   a T-shaped joint having a first receptacle, a second receptacle perpendicular to the first receptacle, and a third receptacle opposite the first receptacle and perpendicular to the second receptacle;
   an intermediate tube attached to the T-shaped joint via the first receptacle;
   a first T-shaped tube having a stem and a cross-piece, one end portion of the cross-piece defining a receptacle into which the intermediate tube is attached and an opposite end portion defining a receptacle for receipt of a first tube member, and the stem defining a pair of apertures therethrough;
   the first tube member attached to the cross-piece of the T-shaped tube opposite the intermediate tube;
   a second tube member attached to the T-shaped joint via the second receptacle;
   a second T-shaped tube having a stem and a cross-piece, the stem being attached to the T-shaped joint via the third receptacle and the cross-piece defining a first end portion and a second end portion; and
   a pair of attachment brackets extending beneath the T-shaped joint from the second T-shaped tube to the first T-shaped tube, wherein the pair of attachment brackets are configured to engage the seat post of the bicycle.

14. The hoist attachment of claim 13, wherein, when the hoist attachment is installed on the bicycle, the first tube member extends in a substantially horizontal direction, and the second tube member extends in a substantially vertical direction.

15. The hoist attachment of claim 13, further comprising a pair of safety caps, such safety caps being installed at distal ends of the first tube member and the second tube member.

16. The hoist attachment of claim 13, wherein the intermediate tube member, the second tube member, and the second T-shaped tube are secured to the T-shaped joint by an adhesive.

17. The hoist attachment of claim 13, wherein the first and second end portions of the second T-shaped tube each define an aperture therethrough for receipt of a first end of one of the respective attachment brackets, and wherein second ends of the attachment brackets terminate in the apertures in the stem of the first T-shaped tube.

* * * * *